(No Model.)
W. CRABB.
FENCE POST.
No. 403,991. Patented May 28, 1889.
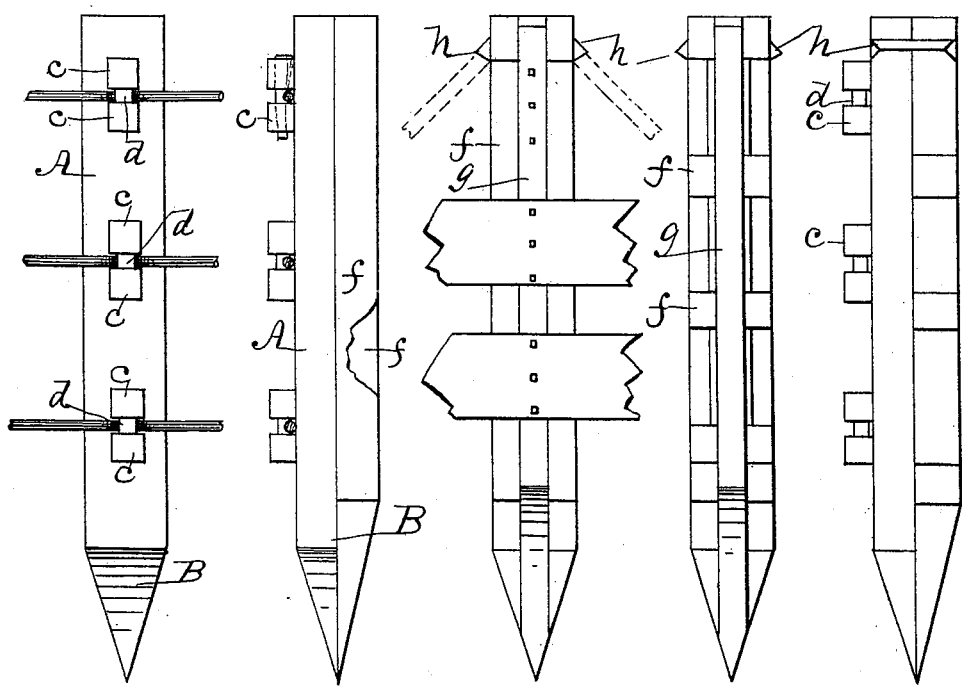
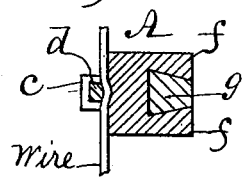
Witnesses:
M. P. Smith.
R. H. Orwig
Inventor:
William Crabb,
By Thomas G. Orwig, Atty.

UNITED STATES PATENT OFFICE.

WILLIAM CRABB, OF PERCY, IOWA.

FENCE-POST.

SPECIFICATION forming part of Letters Patent No. 403,991, dated May 28, 1889.

Application filed December 26, 1888. Serial No. 294,704. (No model.)

*To all whom it may concern:*

Be it known that I, WILLIAM CRABB, a citizen of the United States of America, and a resident of Percy, in the county of Marion and State of Iowa, have invented an Improved Fence-Post, of which the following is a specification.

My object is to provide a metal post with bearings adapted for keying fence-wires fast thereto, and also providing bearings for fastening a bar of wood to one side of the post, so that wooden fence-boards can be readily and securely nailed fast to the post; and I accomplish the results contemplated as hereinafter set forth, pointed out in my claim, and illustrated in the accompanying drawings, in which—

Figure 1 is a face view of a post having bearings for wire rails through which keys are passed downward to clamp the wires fast to the post. Fig. 2 is a view of the same post, taken at right angles relative to Fig. 1. Fig. 3 is a face view of a post, showing a piece of wood secured thereto by means of bearings formed integral with the post in such a manner that boards can be readily nailed fast to the flat face of the wood and post. Figs. 4 and 5 show a series of bearings for the wood in place of one continuous bearing. Fig. 6 is a view looking down from the dotted line $x\ x$ in Fig. 2.

A represents the body, and B the butt, of a post, that may vary in form and shape, as desired.

$c\ c\ c$ are bearings formed integral with one side of the post for the purpose of supporting and fastening fence-wires thereto by means of keys $d$, as clearly shown in Figs. 1 and 2.

$f f$ are parallel flanges, preferably made so as to produce a dovetail bearing adapted to receive and retain a bar of wood, $g$, fitted between them, as clearly shown in Figs. 3 and 6. Figs. 4 and 5 show a series of corresponding bearings that will engage and hold the same bar, $g$. By substituting a series of short flanges for the continuous flanges $f$ the weight and cost of the complete post is reduced.

An improved article of manufacture is thus produced which adapts an iron post to be used for nailing fence-boards thereto, so that a line of posts can be rigidly connected and braced by means of boards to aid in supporting the posts, and also to aid in combination with fence-wire fastened to the same posts to produce a strong, durable, and tight fence that will restrain small animals as well as large animals.

Wooden posts have heretofore had boards and also wires fastened thereto, so I do not claim that it is new to combine boards and wires with a fence-post, but restrict my claim to a metal post adapted for nailing boards thereto and also fastening wire thereto.

$h\ h$ are projections integral with the top of the post that engage the top ends of braces, as indicated by dotted lines in Fig. 3.

I am aware metal fence-posts have had integral bearings for supporting and fastening fence-wires thereto. I am also aware that earthenware sections have been combined by means of a standard placed in coinciding grooves in the separable sections; but my post having integral wire-fastening devices on one side and a wooden bar in bearings on the opposite side is novel and advantageous in that wires and boards can be readily fastened to the post to produce an improved fence.

I claim as my invention—

A metal fence-post having integral wire supporting and fastening devices on one side and a wooden bar on the opposite side to which wooden boards can be nailed and the nails clinched, in the manner set forth.

WILLIAM CRABB.

Witnesses:
 WILLIAM T. JAMES,
 DANIEL HALLOWELL.